United States Patent [19]
Leung et al.

[11] Patent Number: 5,615,361
[45] Date of Patent: Mar. 25, 1997

[54] EXPLOITATION OF UNIQUENESS PROPERTIES USING A 1-TUPLE CONDITION FOR THE OPTIMIZATION OF SQL QUERIES

[75] Inventors: Ting Y. Leung; Mir H. Pirahesh; David E. Simmen, all of San Jose, Calif.; Lori G. Strain, Etobicoke, Canada; Sanjai Tiwari, Mountainview, Calif.

[73] Assignee: International Business Machines Corporation, Armonk, N.Y.

[21] Appl. No.: 384,759

[22] Filed: Feb. 7, 1995

[51] Int. Cl.⁶ .................................................. G06F 17/30
[52] U.S. Cl. .................. 395/603; 364/DIG. 1; 364/282.1; 364/283.4
[58] Field of Search ............................................. 395/600

[56] References Cited

U.S. PATENT DOCUMENTS

| 4,829,427 | 5/1989 | Green | 395/600 |
|---|---|---|---|
| 5,091,852 | 2/1992 | Tsunchida et al. | 395/600 |
| 5,367,675 | 11/1994 | Cheng et al. | 395/600 |
| 5,469,568 | 11/1995 | Schiefer et al. | 395/600 |
| 5,546,570 | 8/1996 | McPherson et al. | 395/600 |
| 5,548,755 | 8/1996 | Leung et al. | 395/600 |
| 5,548,758 | 8/1996 | Pirahesh et al. | 395/600 |
| 5,557,791 | 9/1996 | Cheng et al. | 395/600 |

OTHER PUBLICATIONS

Dayal et al., "An Extended Relational Algebra with Control Over Duplicate Elimination", Computer Corporation of America, Cambridge, MA, (US), ACM 1982, pp. 117–123.

Kim, Won, IBM Research "On Optimizing an SQL–Like Nested Query, *ACM Transactions on Database Systems,*" vol. 7, No. 3, Sep. 1982, pp. 443–469.

Dayal, Umeshwar, "Of Nests and Trees: A Unified Approach to Processing Queries that Contain Nested Subqueries, Aggregates, and Quantifiers", Computer Corporation of America, Cambridge, MA (US), *Proceedings of the 13th VLDB Conference,* 1987, pp. 197–208.

Ganski et al., "Optimization of Nested SQL Queries Revisited", *ACM*, 1987, pp. 23–33.

Haas et al., "Extensible Query Processing in Starburst", IBM Almaden Research Center, San Jose, CA (US), ACM 1989, pp. 377–388.

Date, C. J. & Darwen, Hugh., "Relational Database Management" *Relational Database Writings* 1989–1991, Part II, pp. 133–154.

Pirahesh et al., "Extensible/Rule Based Query Rewrite Optimization in Starburst", IBM Almaden Research Center, San Jose, CA (US), *ACM Sigmond,* Jun. 1992, pp. 39–48.

Levy et al., "Query Optimization by Predicate Move–Around", Proceedings of the 20th VLDB Conference, Santiago, Chile, 1994, pp. 96–107.

(List continued on next page.)

*Primary Examiner*—Paul V. Kulik
*Attorney, Agent, or Firm*—Merchant, Gould, Smith, Edell, Welter & Schmidt

[57] ABSTRACT

The present invention optimizes SQL queries by exploiting uniqueness properties. In identifying whether the generalized 1-tuple condition exists, the query is first analyzed to determine whether any columns referenced in a predicate of the query are bound. According to the present invention, columns may be bound to constant values or correlated columns or columns that are already bound. The bound columns, if any, are then analyzed to determine whether any of the bound columns comprise a key for its associated table. If these conditions exist, then the query satisfies the 1-tuple condition, in that it returns at most one tuple. Once the generalized 1-tuple condition has been identified to exist for the query, important query transformations can be performed for optimization purposes. These query transformations comprise the transformation of scalar subqueries into joins, or the elimination of distinctiveness requirements (i.e., DISTINCT keywords) from SELECT clauses.

15 Claims, 12 Drawing Sheets

OTHER PUBLICATIONS

Paulley et al., "Exploiting Uniqueness in Query Optimization", Department of computer Science, University of Waterloo, Ontario, Canada, IEEE 1994, pp. 68–79.

Lohman et al., "Research Report—Query Processing in R*", IBM Resarch Laboratory, San Jose, CA (US) IBM Research Division, Apr. 1984, pp. 1–33.

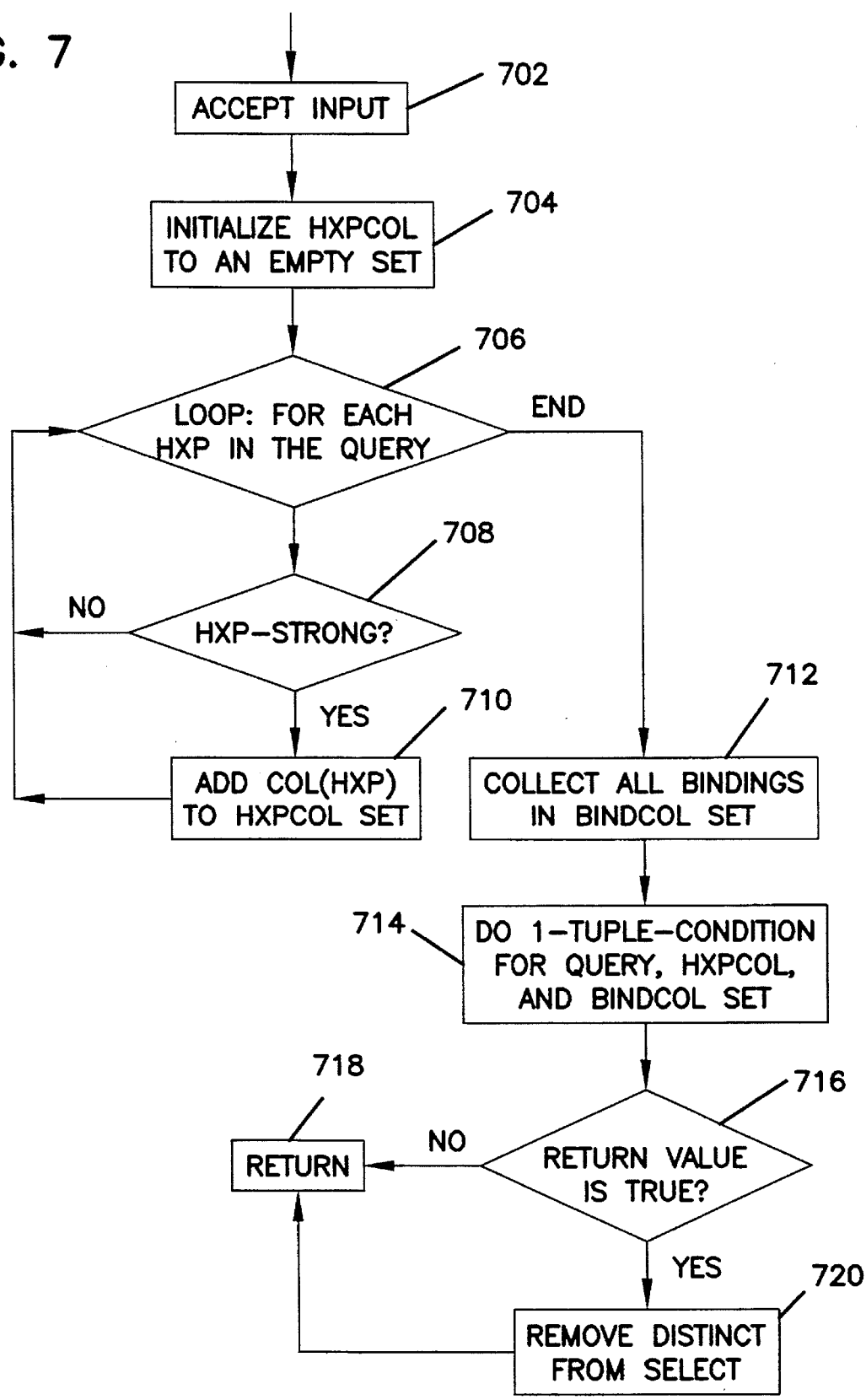

EXPLOITATION OF UNIQUENESS PROPERTIES USING A 1-TUPLE CONDITION FOR THE OPTIMIZATION OF SQL QUERIES

BACKGROUND OF THE INVENTION

1. Field of the Invention

This invention relates in general to database management systems performed by computers, and in particular, to the optimization of SQL queries in a relational database management system by exploiting uniqueness properties using a 1-tuple condition.

2. Description of Related Art

Computer systems incorporating Relational DataBase Management System (RDBMS) software using a Structured Query Language (SQL) interface are well known in the art. The SQL interface has evolved into a standard language for RDBMS software and has been adopted as such by both the American Nationals Standard Organization (ANSI) and the International Standards Organization (ISO).

In RDBMS software, all data is externally structured into tables. The SQL interface allows users to formulate relational operations on the tables either interactively, in batch files, or embedded in host languages such as C, COBOL, etc. Operators are provided in SQL that allow the user to manipulate the data, wherein each operator operates on either one or two tables and produces a new table as a result. The power of SQL lies on its ability to link information from multiple tables or views together to perform complex sets of procedures with a single statement.

In the SQL standard, a SELECT statement is used to retrieve data and generally comprises the format: "SELECT <clause> FROM <clause> WHERE <clause> GROUP BY <clause> HAVING <clause> ORDER BY <clause>." The clauses generally must follow this sequence, but only the SELECT and FROM clauses are required. The result of a SELECT statement is a subset of data retrieved by the RDBMS software from one or more existing tables or views stored in the relational database, wherein the FROM clause tells the RDBMS software the name of the table or view from which data is being selected. The subset of data is treated as a new table, termed the result table, which typically comprises a temporary table. In general, the items specified in the SELECT clause of the SELECT statement determine the columns that will be returned in the result table from the table(s) identified in the FROM clause.

A DISTINCT keyword may be used in the SELECT clause to eliminate what would be duplicate rows in the result table. Although the DISTINCT keyword may only be specified in the SELECT clause, it affects the rows that are returned, but not the columns. The DISTINCT keyword acts upon the intermediate result set, so that each row of the result table is unique. The default ALL keyword has the opposite effect in that it returns all rows, including duplicates.

The WHERE clause determines which rows should be returned in the result table. Generally, the WHERE clause contains a search condition that must be satisfied by each row returned in the result table. The rows that meet the search condition form an intermediate set, which is then processed further according to specifications in the SELECT clause. The search condition typically comprises one or more predicates, each of which specify a comparison between two values comprising columns, constants or correlated values. Multiple predicates in the WHERE clause are themselves typically connected by Boolean operators.

A join operation makes it possible to combine tables or views by combining rows from one table or view to another table or view. The rows, or portions of rows, from the different tables or views are concatenated horizontally. The join operation is implied by naming more than one table or view in the FROM clause of a SELECT statement. Although not required, join operations normally include a WHERE clause that identifies the columns through which the rows can be combined. The WHERE clause may also include a predicate comprising one or more conditional operators that are used to select the rows to be joined.

In a SELECT-FROM-WHERE query, identifying situations where at most one tuple is retrieved by the query (termed a "1-tuple condition") permits important query transformations and optimizations. Certain instances of the identification of 1-tuple conditions have been performed in the prior art, as disclosed in the following publications, which are incorporated by reference herein:

1. Hamid Pirahesh, Joseph Hellerstein, and Waqar Hasan, "Extensible/Rule Based Query Rewrite Optimization in STARBURST," *Proceedings of ACM SIGMOD '92 International Conference on Management of Data*, San Diego, Calif., 1992, (hereinafter referred to as "[PHH92]");
2. Hugh Darwen, "The Role of Functional Dependence in Query Decomposition," *Relational Database Writings 1989–1991*, Chapter 10, pp. 133–154, 1992, (hereinafter referred to as "[DAR92]"); and
3. G. N. Paulley and Per-Ake Larson, "Exploiting Uniqueness in Query Optimization," *Proceedings of IEEE '94 International Conference on Data Engineering*, Houston, Tex., 1994, pp. 68–79, (hereinafter referred to as "[PL94]").

However, there is a need in the art for improved methods of identifying 1-tuple conditions and of optimizing SQL queries by exploiting the identified 1-tuple conditions.

SUMMARY OF THE INVENTION

To overcome the limitations in the prior art described above, and to overcome other limitations that will become apparent upon reading and understanding the present specification, the present invention discloses a method and apparatus for optimizing SQL queries by exploiting uniqueness properties for the queries. These uniqueness properties are identified by determining whether a generalized 1-tuple condition exists for the query.

In identifying whether the generalized 1-tuple condition exists, the query is first analyzed to determine whether any columns referenced in a predicate of the query are bound. According to the present invention, columns may be bound to constant values or correlated columns or columns that are already bound. The bound columns, if any, are then analyzed to determine whether any of the bound columns comprise a key for its associated table. If these conditions exist, then the query satisfies the 1-tuple condition, in that it returns at most one tuple.

Once the generalized 1-tuple condition has been identified to exist for the query, important query transformations can be performed for optimization purposes. These query transformations comprise the transformation of scalar subqueries into joins, or the elimination of distinctiveness requirements (i.e., DISTINCT keyword) from the SELECT clause.

With regard to the transformations of scalar subqueries, the present invention analyzes the query to determine whether a predicate of the query includes a scalar subquery as an operand to a relational operator as a Boolean factor in the WHERE clause. If so, the scalar subquery is analyzed to determined whether it returns at most one tuple using the steps described above. If both conditions are met, then the scalar subquery can be transformed into a join operation in the query.

With regard to the elimination of distinctiveness requirements, the present invention analyzes the query by determining whether the query includes a distinctiveness requirement for a result table, by collecting a set of output columns that can be bound to a single value, and by determining whether the query returns at most one tuple by assuming the column set obtained a priori are bound. If these conditions are met, then the distinctiveness requirement for the result table can be removed from the query.

BRIEF DESCRIPTION OF THE DRAWINGS

Referring now to the drawings in which like reference numbers represent corresponding parts throughout:

FIG. 7 is a flowchart illustrating the DISTINCT-PULLUP routine according to the present invention.

DETAILED DESCRIPTION OF THE PREFERRED EMBODIMENT

Figure 1:
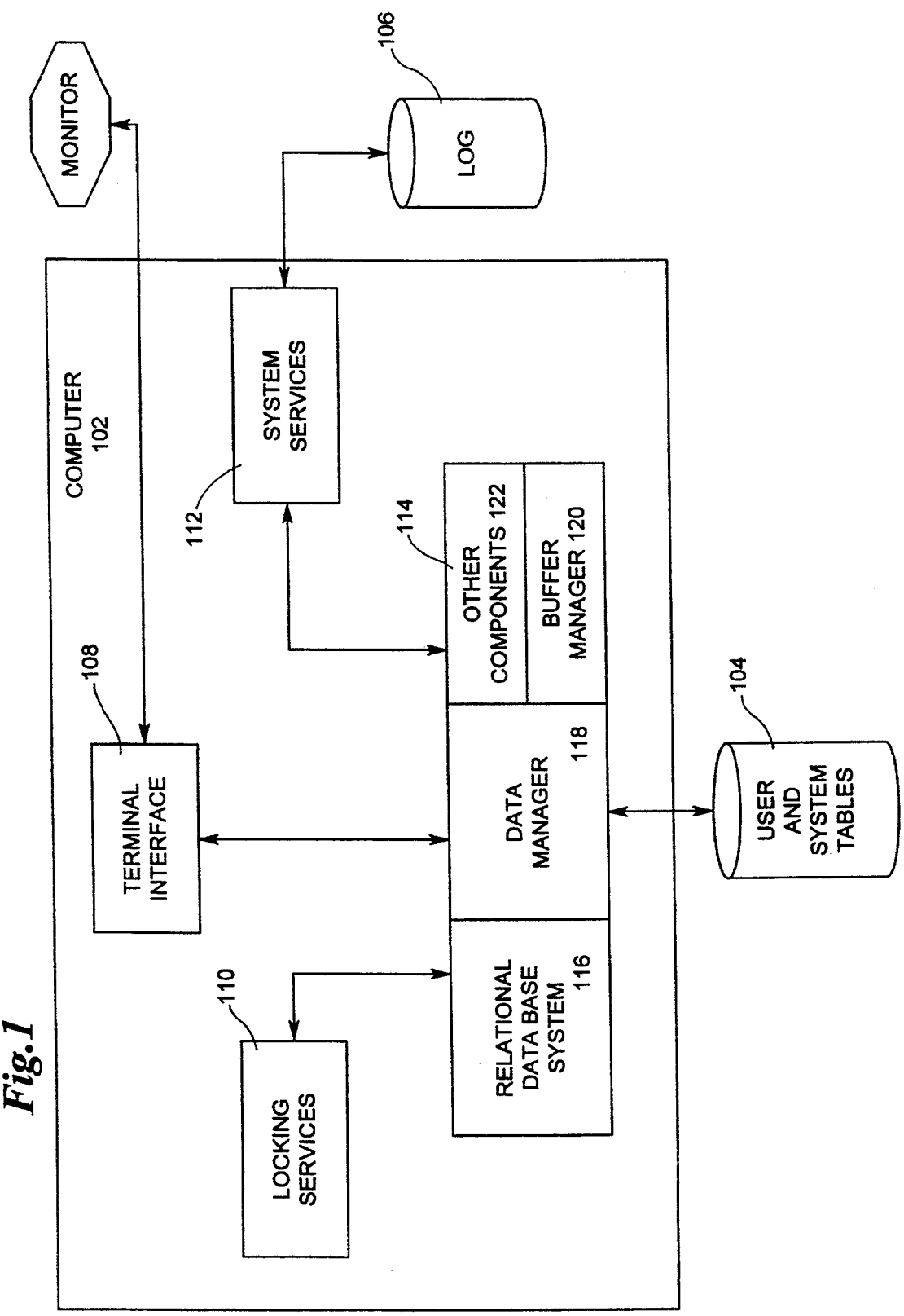
FIG. 1 illustrates the computer hardware environment of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

DEFINITIONS

Following are definitions for a number of terms used in the present specification. These definitions are required for an understanding of later portions of the present specification.

Quantifiers

Quantifiers are table references of base tables or derived tables. Quantifiers have different types: type 'F' quantifiers correspond to the table references in the FROM clause of the query; type 'A' quantifiers correspond to the ALL subquery in the WHERE clause; type 'E' quantifiers correspond to the subquery associated with the predicates EXISTS, IN, ANY, and SOME; and type 'ES' quantifiers correspond to scalar quantifiers where at most one tuple can be returned from the subquery. In the present specification, only 'F' type quantifiers are considered, unless otherwise stated.

Bindings

Constants, host variables and parameter markers provide column bindings during query execution time.

Correlation Column References

For a correlated subquery, correlation column references also provide bindings during every execution of the subquery, although the values may be different depending on the execution of its parent query block. Bindings available via correlation column references are called correlation bindings.

Eligible Predicates

Given a set of bindings (including correlation bindings, constants, etc.), a predicate is considered eligible with respect to a set of quantifiers, if columns involved in the predicate can get the bindings from any quantifier in the set of quantifiers. For example, a predicate "T1.C1+T1.C2= T2.C1" is eligible with respect to the set of quantifiers containing (T1, T2), but not with respect to the set of quantifiers containing only (T1). Unless otherwise stated, the present invention considers predicates only in Boolean factors.

Keys

A key for a derived or base table is a minimal set of columns that can uniquely determine a tuple in the table. That is, given two tuples with the same values on the key columns, the data values of the other non-key columns of these two tuples must be the same. Note that this definition does not preclude having null values in the key column(s). For example, the primary key of a base table is a key. Also, given a unique index on one or more columns, the set of indexed columns form a key of the table.

OVERVIEW

The present invention generalizes the determination of 1-tuple conditions for SQL queries by analyzing keys for the columns referenced in the queries, as well as analyzing equality predicates (including join predicates) that comprise the search conditions for the queries. More specifically, the generalized 1-tuple condition determines if a SELECT-FROM-WHERE query (also known as a "SELECT box") returns at most one tuple by analyzing each input, i.e., each operand table, of the SELECT box, and by analyzing equality predicates ("=") in the WHERE clause of the SELECT box. Proving, at query compilation time, that a 1-tuple condition exists can result in important query transformations and optimizations.

In one aspect of the present invention, a generalized 1-tuple condition for a query is verified by exploiting keys of derived and base tables. For example, suppose the following tables are defined in the RDBMS software:

T1 (C1, C2, C3, C4, ... )

T2 (C1, C2, C3, C4, ... )

wherein columns <C1> and <C1,C2> are primary keys, or similarly, wherein there exist unique indices on columns <C1> and <C1,C2> for T1 and T2, respectively. Then, consider the following query:

```
SELECT   T1.C1, T1.C2
FROM     T1
WHERE    T1.C2 = (SELECT T2.C4
                  FROM    T2
                  WHERE   T1.C3 = T2.C1 AND
                          T1.C4 = T2.C2)
``` wherein "(SELECT T2.C4 . . . )" comprises a scalar subquery.

By definition, a scalar subquery has the following requirements. First, the subquery returns at most one tuple (a runtime error occurs if more than one tuple is returned). Second, if the evaluation of the subquery results in an empty set, then a null value is returned.

The present invention may be able to identify the 1-tuple condition for a scalar subquery during compilation. Further, the present invention can differentiate between a null value and an empty set being returned by the scalar subquery, if the scalar subquery is used in a predicate (e.g., as an operand to a relational operator such as "="), wherein a null value would result in the predicate being evaluated as false.

In the above example, it can be verified during query compilation that the scalar subquery ("SELECT T2.C4 . . . ") can return at most one tuple. The reason is that T2.C1 and T2.C2 together form a key for T2, and therefore the WHERE clause for the subquery matches at most one tuple. That is, for each execution of the subquery, at most one T2.C4 value will be returned.

Detecting at query compile time that a subquery can return at most one tuple allows the RDBMS software to ignore the runtime requirement that requires it to enforce a maximal cardinality of one for the scalar subquery. It also allows the RDBMS software to convert the scalar subquery to a join and thus eliminate the correlation. Further, it also allows the RDBMS software to consider different join orders.

For example, because of the 1-tuple condition, the above query can be converted into a join of the form:

```
SELECT   T1.C1, T1.C2
FROM     T1, T2
WHERE    T1.C2 = T2.C4 AND T1.C3 = T2.C1 AND
         T1.C4 = T2.C2
```

Consider another example of a correlated scalar subquery in the SELECT clause:

```
SELECT   T1.C1, T1.C2,   (SELECT   T2.C4
                          FROM     T2
                          WHERE    T1.C3 = T2.C1 AND
                                   T1.C4 = T2.C2)
FROM     T1
WHERE    T1.C4 > 50
```

Like the previous example, the runtime requirement the RDBMS software enforces a maximal cardinality of one for the scalar subquery can be ignored. In this example, however, the scalar subquery cannot be converted into a join, because the scalar subquery is in the SELECT clause.

In another aspect of the present invention, complex expressions in equality predicates are used to generalize the 1-tuple condition for the query. For example, the present invention can verify that the following query returns at most one tuple:

```
SELECT   T1.C2
FROM     T1
WHERE    T1.C1 = :HV + 10
``` wherein :HV is a host variable that allows an external value to be passed to the query for evaluation in the WHERE clause. In this example, at most one tuple is returned by the query, because :HV+10 is a constant (that depends on the external value) and C1 is a key for T1.

Using the generalized 1-tuple condition, the present invention can also verify that the following query returns at most one tuple:

```
SELECT   T1.*
FROM     T1, T2
WHERE    T1.C1 = 1 AND (T1.C2+T1.C3) = T2.C1 AND
         T1.C4 = T2.C2
```

Only one tuple from T1 matches the predicate "T1.C1=1", because C1 is a key for T1. Further, only one tuple from T2 will match "(T1.C2+T1.C3)=T2.C1 AND T1.C4=T2.C2", because (T1.C2+T1.C3) and T1.C4 each comprise one value, and T2.C1 and T2.C2 together form a key for T2. Hence, only one tuple is returned in the answer set.

In yet another aspect of the present invention, identifying 1-tuple conditions during query compilation sometimes allows DISTINCT keywords to be removed from SELECT-FROM-WHERE queries, and thus unnecessary SORTs can be avoided. This can be achieved by identifying the generalized 1-tuple condition using additional column binding information. This will become clear in the following example.

Consider the above T1 and T2 tables. The present invention can safely remove the DISTINCT keyword from the following query:

```
SELECT   DISTINCT T1.C1, T1.C2
FROM     T1, T2
WHERE    (T1.C2+T1.C3) = T2.C1 AND T1.C4 = T2.C2
```

Each T1 tuple matches at most one T2 tuple, due to the composite key <C1,C2> on T2. Moreover, since the key of T1 (<C1>) is in the SELECT clause, the output of the query does not have any duplicates. Hence, the DISTINCT keyword can be safely removed, resulting in:

```
SELECT   T1.C1, T1.C2
FROM     T1, T2
WHERE    (T1.C2+T1.C3) = T2.C1 AND T1.C4 = T2.C2
```

The analysis that determines whether these transformations can be performed uses the generalized 1-tuple condition. For example, if columns T1.C1 and T1.C2 in the SELECT clause above are bound to constants, and the generalized 1-tuple condition is true for the query, then the query will not return any duplicate tuples. The use of column bindings in determining the generalized 1-tuple condition is similar to adding an extra predicate on the key column, i.e., "T1.C1=CONSTANT" when determining if at most one tuple is returned.

All of the above query transformations can lead to the merging of subqueries, the elimination of correlation, and the use of different join orders. As a result, the present invention can provide many orders of magnitude of performance improvement.

HARDWARE ENVIRONMENT

FIG. 1 illustrates an exemplary computer hardware environment that could be used with the present invention. In the exemplary environment, a computer system 102 is comprised of one or more processors connected to one or more electronic storage devices 104 and 106, such as disk drives, that store one or more relational databases.

Operators of the computer system 102 use a standard operator interface 108, such as IMS/DB/DC, GIGS, TSO, OS/2 or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software. In the preferred embodiment of the present invention, the RDBMS software comprises the DB2 product offered by IBM for the MVS or OS/2 operating systems. Those skilled in the art will recognize, however, that the present invention has application to any RDBMS software that uses SQL.

As illustrated in FIG. 1, the DB2 architecture for the MVS operating system includes three major components: the IMS Resource Lock Manager (IRLM) 110, the Systems Services module 112, and the Database Services module 114. The IRLM 110 handles locking services, because DB2 treats data as a shared resource, thereby allowing any number of users to access the same data simultaneously, and thus concurrency control is required to isolate users and to maintain data integrity. The Systems Services module 112 controls the overall DB2 execution environment, including managing log data sets 106, gathering statistics, handling startup and shutdown, and providing management support.

At the center of the DB2 architecture is the Database Services module 114. The Database Services module 114 contains several submodules, including the Relational Database System (RDS) 116, the Data Manager 118, the Buffer Manager 120 and other components 122 such as an SQL compiler/interpreter. These submodules support the functions of the SQL language, i.e., definition, access control, retrieval, and update of user and system data.

INTERACTIVE SQL EXECUTION

Figure 2:
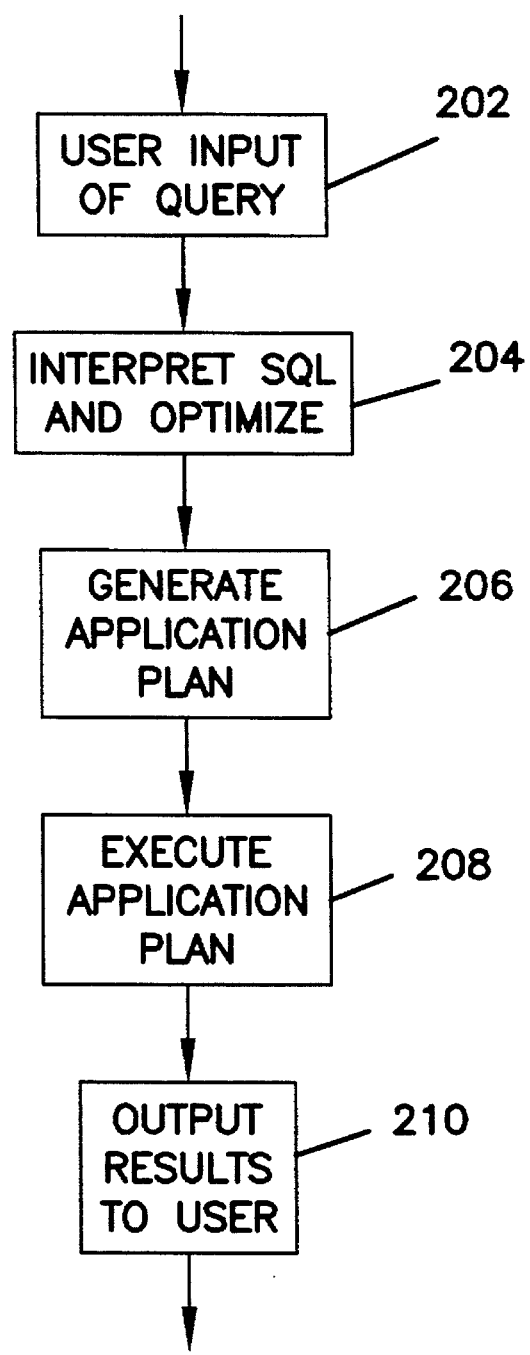
FIG. 2 is a flowchart illustrating the steps necessary for the interpretation and execution of SQL statements in an interactive environment according to the present invention.

FIG. 2 is a flowchart illustrating the steps necessary for the interpretation and execution of SQL statements in an interactive environment according to the present invention. Block 202 represents the input of SQL statements into the computer system 102 from the user. Block 204 represents the step of compiling or interpreting the SQL statements. An optimization function within block 204 may transform the SQL query in a manner described in more detail later in this specification. Block 206 represents the step of generating a compiled set of runtime structures called an application plan from the compiled SQL statements. Generally, the SQL statements received as input from the user specify only the data that the user wants, but not how to get to it. This step considers both the available access paths (indexes, sequential reads, etc.) and system held statistics on the data to be accessed (the size of the table, the number of distinct values in a particular column, etc.), to choose what it considers to be the most efficient access path for the query. Block 208 represents the execution of the application plan, and block 210 represents the output of the results of the application plan to the user.

EMBEDDED/BATCH SQL EXECUTION

Figure 3:
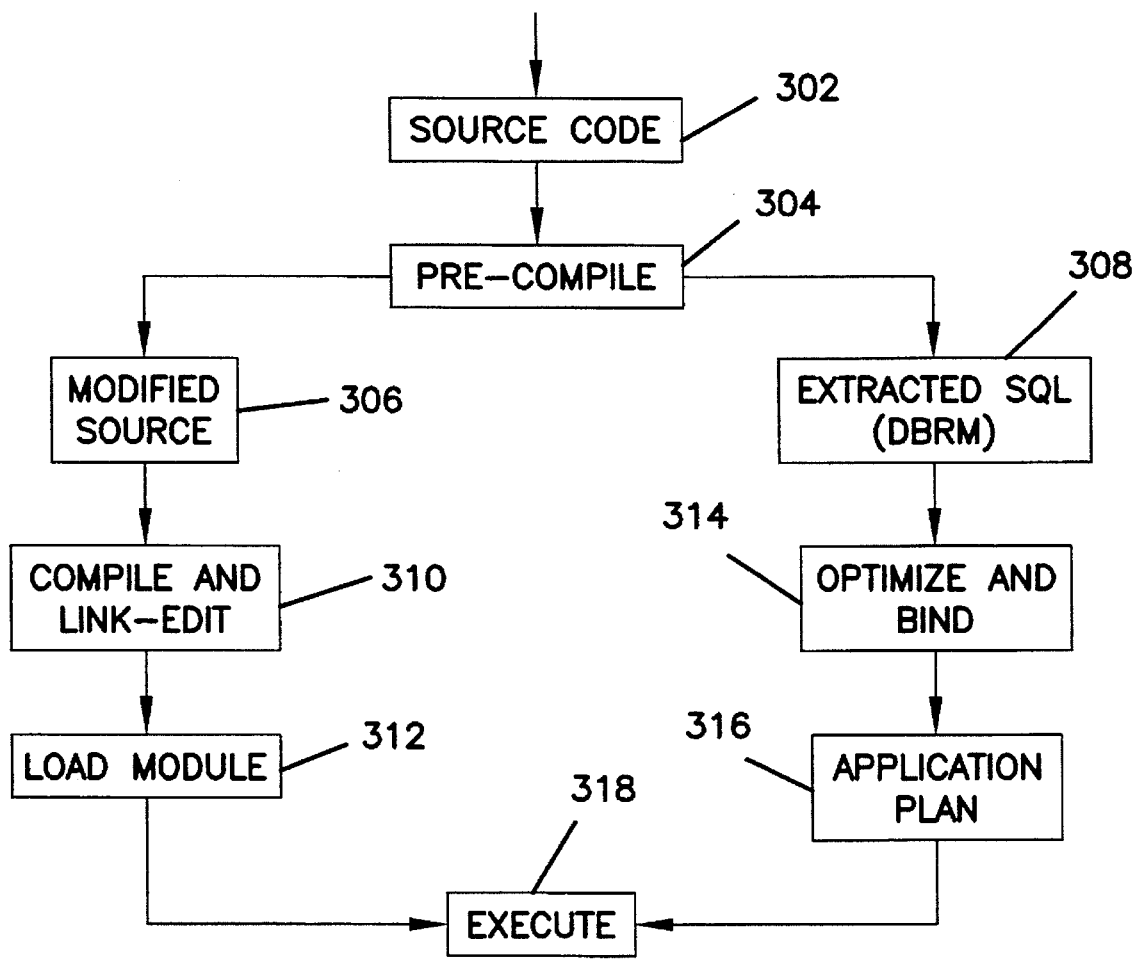
FIG. 3 is a flowchart illustrating the steps necessary for the interpretation and execution of SQL statements embedded in source code according to the present invention.

FIG. 3 is a flowchart illustrating the steps necessary for the interpretation and execution of SOL statements embedded in source code according to the present invention. Block 302 represents program source code containing a host language (such as COBOL or C) and embedded SOL statements. The program source code is then input to a pre-compile step 304. There are two outputs from the pre-compile step 304: a modified source module and a Database Request Module (DBRM) 308. The modified source module 306 contains host language calls to DB2, which the pre-compile step 304 inserts in place of SOL statements. The DBRM 308 consists of the SQL statements from the program source code 302. A compile and link-edit step 310 uses the modified source module 306 to produce a load module 312, while an optimize and bind step 314 uses the DBRM 308 to produce a compiled set of runtime structures for the application plan 316. As indicated above in conjunction with FIG. 2, the SQL statements from the program source code 302 specify only the data that the user wants, but not how to get to it. The optimize and bind step 314 may reorder the SOL query in a manner described in more detail later in this specification. Thereafter, the optimize and bind step 314 considers both the available access paths (indexes, sequential reads, etc.) and system held statistics on the data to be accessed (the size of the table, the number of distinct values in a particular column, etc.), to choose what it considers to be the most efficient access path for the query. The load module 312 and application plan 316 are then executed together at step 318.

SQL OPTIMIZATION

Figure 4:
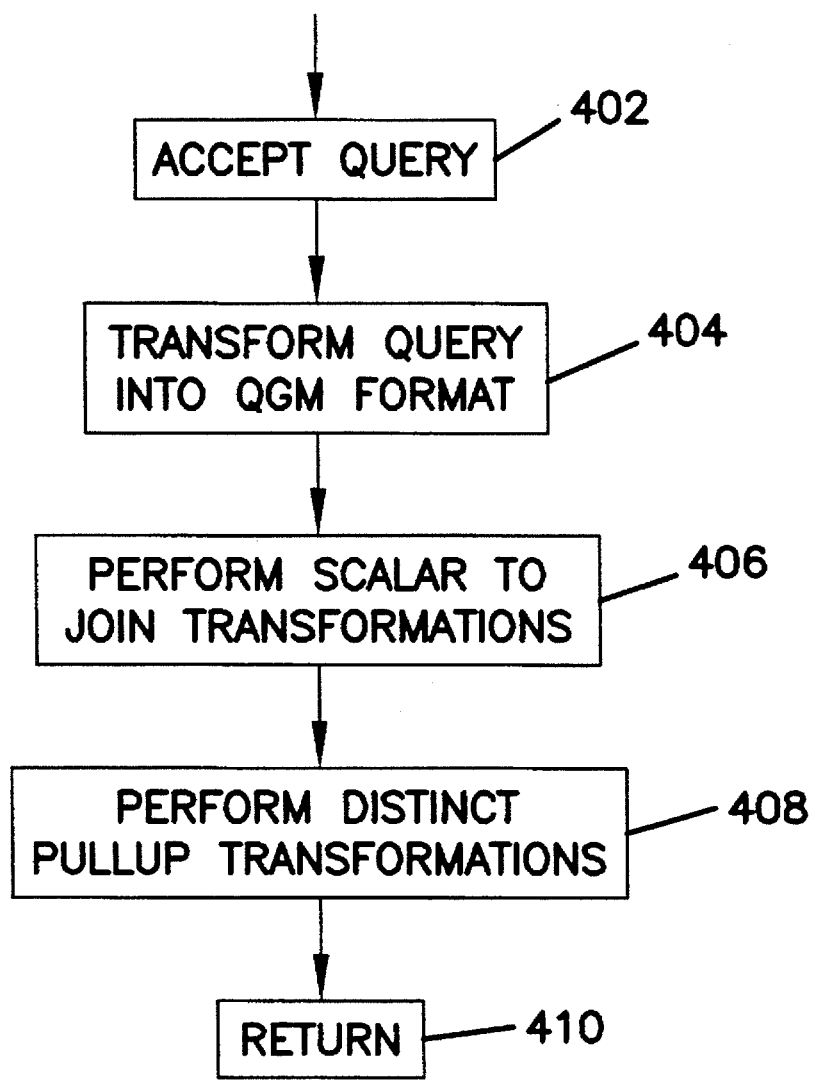
FIG. 4 is a flowchart illustrating the method of optimizing SQL queries according to the present invention.

FIG. 4 is a flowchart illustrating the method of optimizing SQL queries in steps 204 of FIG. 2 and 314 of FIG. 3 according to the present invention. Block 402 represents the acceptance of the SQL query.

Block 404 represents the translation of the query into a Query Graph Model (QGM). The QGM is well known in the art, and is more fully described in the following publications, both of which are incorporated by reference herein:

1. L. Haas, W. Chang, G. M. Lohman, J. McPherson, P. F. Wilms, G. Lapis, B. Lindsay, H. Pirahesh, M. Carey, and E. Shekita, "STARBURST Mid-flight: As the Dust Clears," *IEEE Transactions on Knowledge and Data Engineering*, March 1990, (hereinafter referred to as "[HAAS90]"); and 2. Hamid Pirahesh, Joseph Hellerstein, and Waqar Hasan, "Extensible/Rule Based Query Rewrite Optimization in STARBURST," *Proceedings of ACM SIGMOD '92 International Conference on Management of Data*, San Diego, Calif. 1992, (hereinafter referred to as "[PIRA92]").

The QGM supports arbitrary table operations where the inputs are tables and outputs are tables, such as the SELECT, GROUP BY, UNION, INTERSECT and EXCEPT operations defined in the SQL standard, and the restriction, projection and join operations performed by the SELECT operation.

In QGM, each operation is represented in a data structure having a head and a body. The head describes the output table produced by the operation, and the body specifies the operation required to compute the output table. The head has a number of output columns such as those specified in the SELECT clause of a query, wherein the specification of these columns includes column names, types, and output ordering information. The head also includes a Boolean attribute called "distinct" that indicates whether the associated table contains only distinct tuples ("head.distinct=IS"), or whether it may contain duplicates ("head.distinct= NONE"). Each output column, which either returns results to the user or forms a derived column, may have an associated expression, termed a head expression, corresponding to expressions allowed in the SELECT clause of the query.

Figure 6:
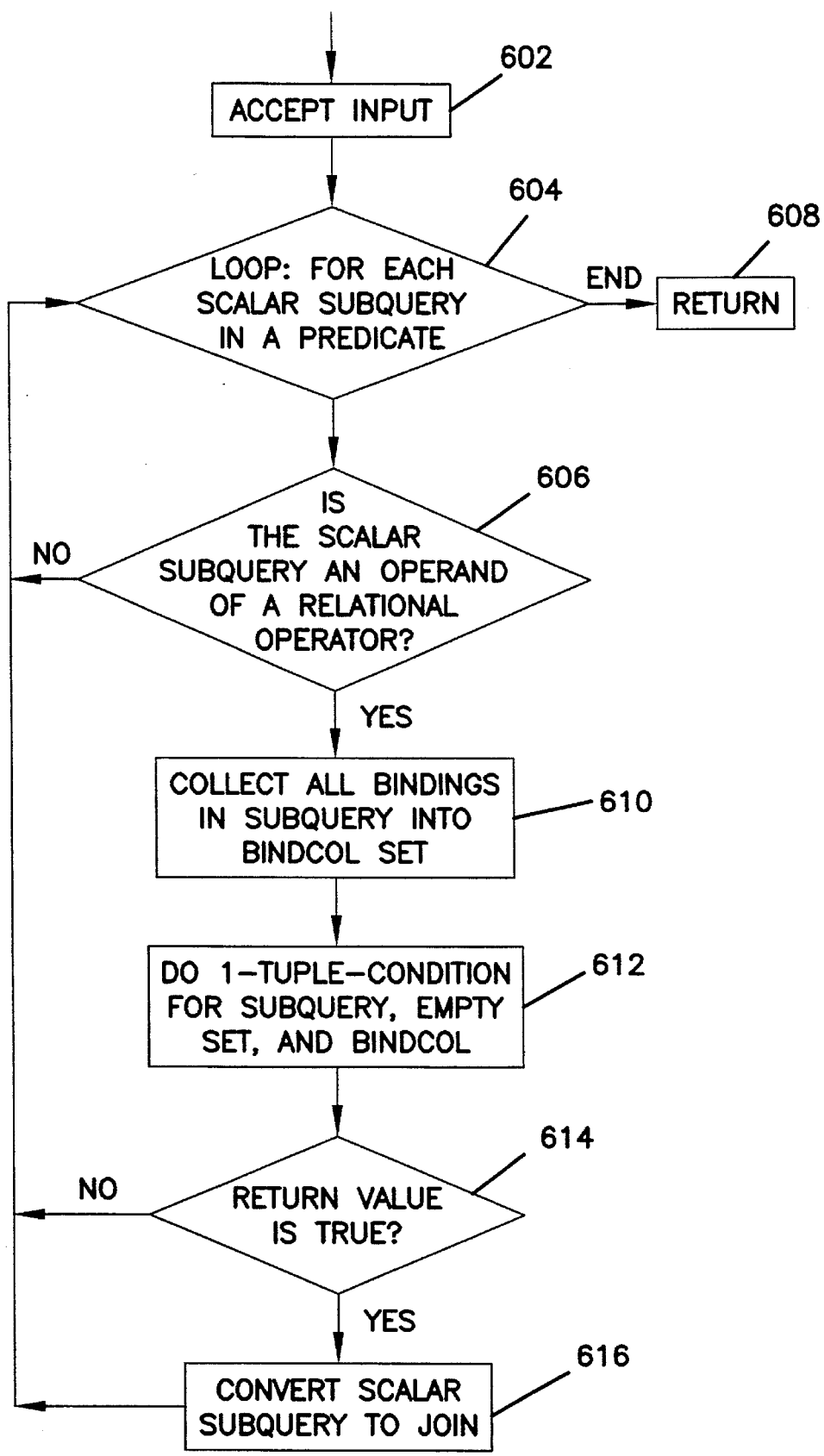
FIG. 6 is a flowchart illustrating the SCALAR-SUB-QUERY-TO-JOIN routine according to the present invention.

Block 406 represents the RDBMS software transforming scalar subqueries into join operations, as described in more detail in conjunction with FIG. 6. Block 408 represents the RDBMS software performing DISTINCT pullup transformations in the query, as described in more detail in conjunction with FIG. 7. After these query transformation steps are performed, block 410 returns control to block 204 in FIG. 2 or block 314 in FIG. 3 for subsequent processing steps, including the execution of the SQL query against the relational database and the output of the result table to the user.

GENERALIZED 1-TUPLE CONDITION

FIGS. 5A–5F together are a flowchart that illustrates the steps required for determining whether a generalized 1-tuple condition exists according to the present invention. This method comprises a common series of steps found in both the scalar subquery transformations of FIG. 6 and the DISTINCT pullup transformations of FIG. 7. Further, the steps of this method are preferably implemented as one or more routines or functions performed in the RDBMS software executed by the computer system 102.

Definitions

Following are definitions for a number of terms used in the 1-TUPLE-CONDITION routine. These definitions are required for an understanding of the flowchart that illustrates the method of the 1-TUPLE-CONDITION routine.

QUN
  A quantifier.
A-QUNSET
  A set of all quantifiers in the SELECT-FROM-WHERE query.
SINGLEQUNSET
  A set of singleton quantifiers that return at most one tuple.
P-SINGLEQUNSET
  A set of quantifiers that potentially return at most one tuple.
PKEYSET
  A set of columns for testing if the set contains a key.

Flowchart

Figure 5A:
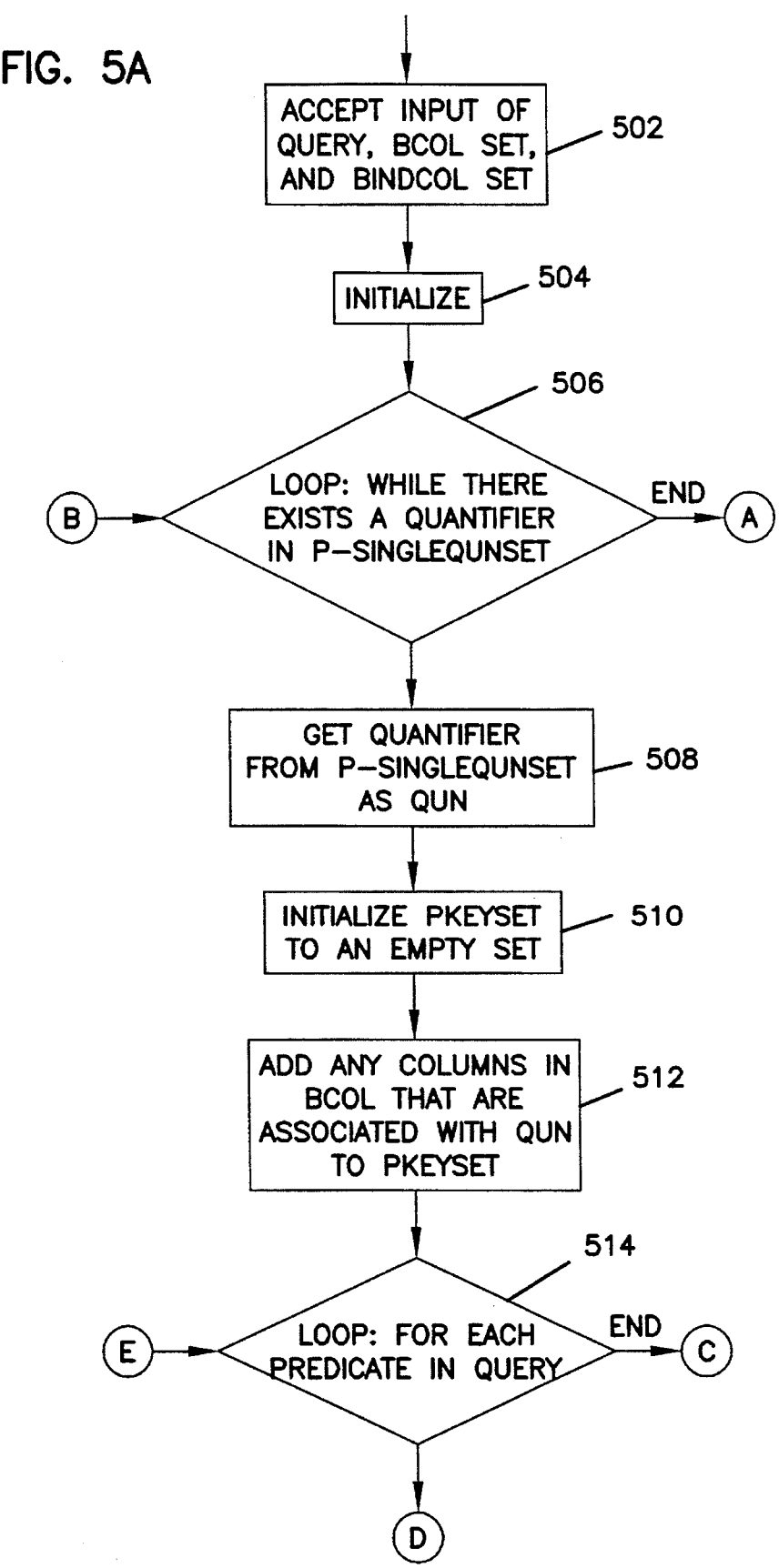
FIGS. 5A–5F together are a flowchart illustrating the 1-TUPLE-CONDITION routine according to the present invention.

Referring first to FIG. 5A, block 502 represents the acceptance of the inputs into the 1-TUPLE-CONDITION routine. The inputs to the routine comprise the following:

1. a SELECT-FROM-WHERE query (preferably in QGM format);
2. a set of columns, denoted as BCOL, that are assumed bound to a single constant value; and
3. a set of bindings, denoted as BINDCOL, including correlation bindings, constants, host variables and parameter markers.

Block 504 represents an initialization step, wherein the SINGLEQUNSET is initialized to empty, the A-QUNSET is initialized to contain all type 'F' quantifiers in the SELECT-FROM-WHERE query, the P-SINGLEQUNSET is initialized to contain all quantifiers in the A-QUNSET.

Block 506 is a decision block that represents a "while" loop. Block 506 transfers control to block 508 as the first step of the loop while there exists a quantifier in P-SINGLEQUNSET. Otherwise, control transfers to "A" in FIG. 5F.

Block 508 represents the selection of a quantifier, denoted as QUN, from P-SINGLEQUNSET. Block 510 represents the initialization of PKEYSET to an empty set. Block 512 adds any columns in BCOL that are associated with the quantifier QUN to PKEYSET.

Block 514 is a decision block that represents a sequential "for" loop that is executed once for each predicate in the query. Block 514 transfers control to "D" in FIG. 5B as the first step of the loop for each predicate in the query. Otherwise, control transfers to "C" in FIG. 5C after all the predicates in the query have been processed in the loop.

Figure 5B:
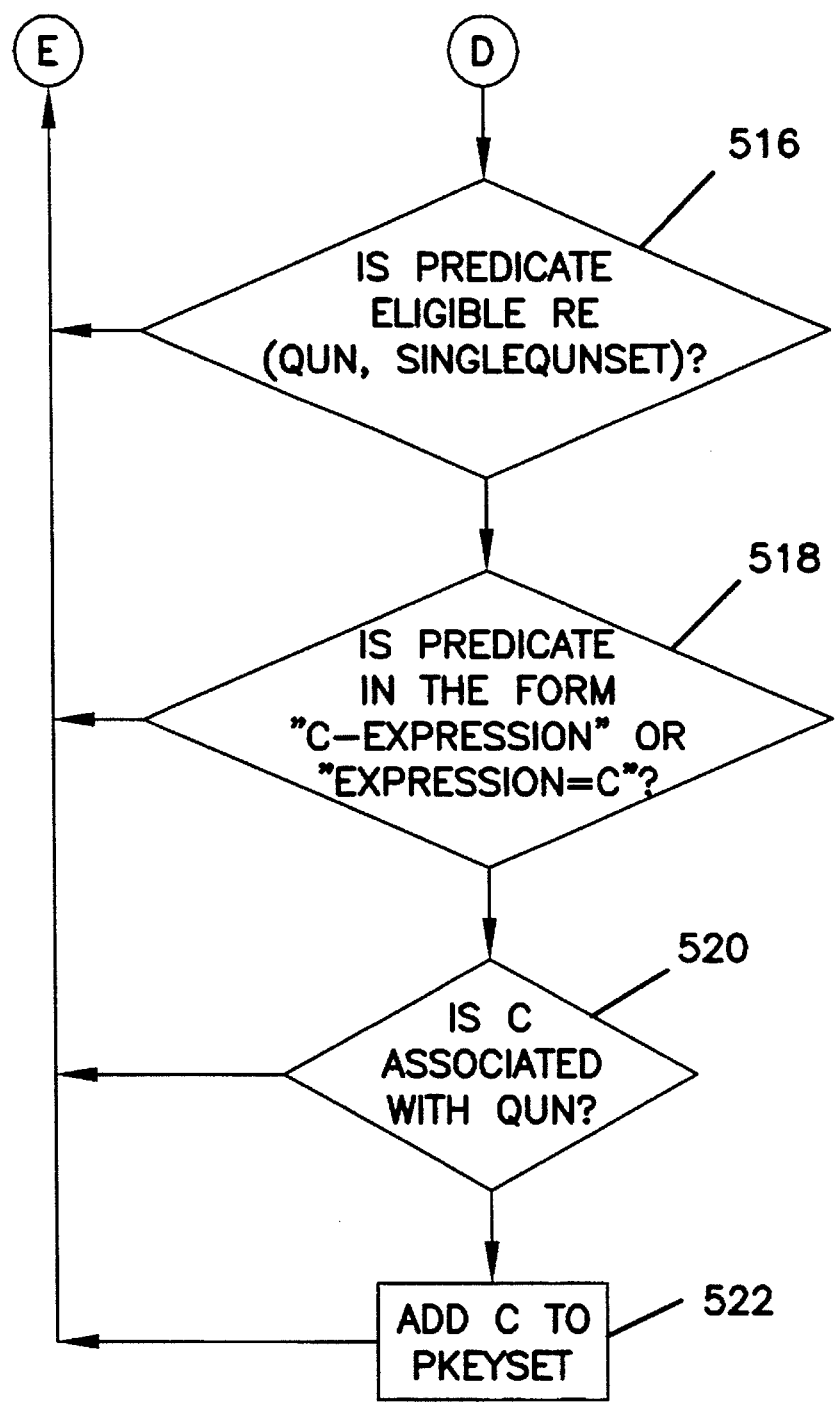

Referring now to FIG. 5B, control transfers from "D" to block 516, which is a decision block that determines whether, given the contents of the BINDCOL set, the predicate is "eligible" with respect to the quantifier set {QUN, SINGLEQUNSET}. If not, then control transfers to "E" in FIG. 5A, which returns to block 514 to complete the loop. Otherwise, control transfers to block 518.

Block 518 is a decision block that determines whether the predicate is in the form of "C=EXPRESSION" or "EXPRESSION=C", where "EXPRESSION" can be a complex expression that does not contain any columns associated with QUN. If not, then control transfers to "E" in FIG. 5A, which returns to block 514 to complete the loop. Otherwise, control transfers to block 520.

Block 520 is a decision block that determines whether C is a column associated with the quantifier QUN. If not, then control transfers to "E" in FIG. 5A, which returns to block 514 to complete the loop. Otherwise, control transfers to block 522.

Block 522 adds the column C to PKEYSET. Thereafter, control transfers to "E" in FIG. 5A, which returns to block 514 to complete the loop.

Figure 5C:
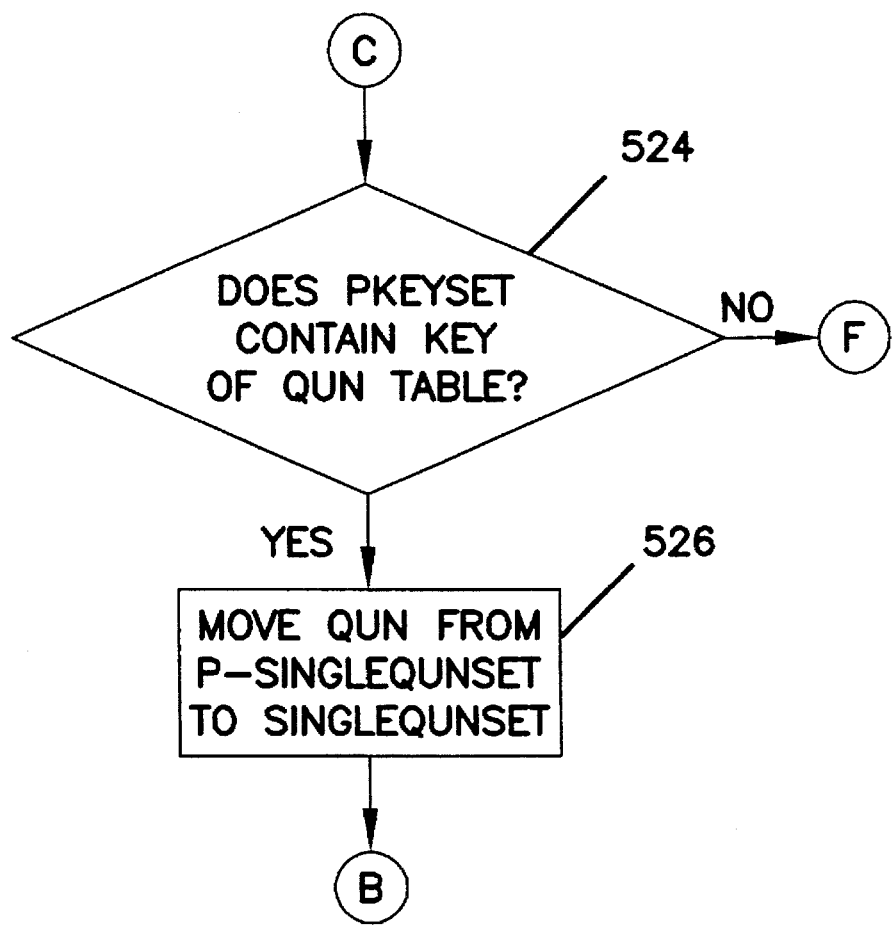

Referring now to FIG. 5C, control transfers from "C" to block 524, which is a decision block that determines whether PKEYSET contains a key of the table that QUN is ranging over. If not, then control transfers to "F" in FIG. 5D. Otherwise, control transfers to block 526.

Block 526 moves the quantifier QUN from P-SINGLEQUNSET into SINGLEQUNSET. Thereafter, control transfers to "B" in FIG. 5A, which returns to block 506 to complete the loop.

Figure 5D:
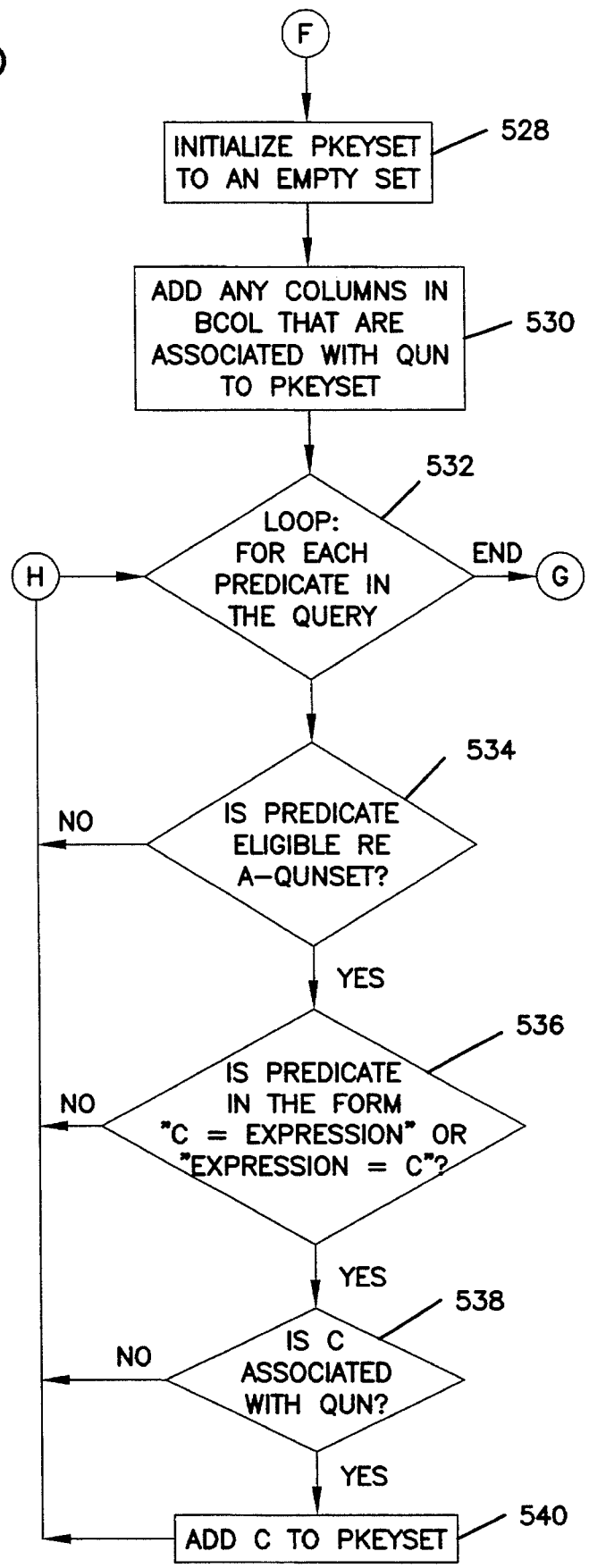

Referring now to FIG. 5D, control transfers from "F" to block 528, which initializes PKEYSET to an empty set. Block 530 adds any columns in BCOL that are associated with the quantifier QUN to PKEYSET.

Block 532 is a decision block that represents a sequential "for" loop that is executed once for each predicate in the query. Block 532 transfers control to block 534 as the first step of the loop for each predicate in the query. Otherwise, control transfers to "G" in FIG. 5E after all the predicates in the query have been processed in the loop.

Block 534 is a decision block that determines whether, given the contents of the BINDCOL set, the predicate is "eligible" with respect to the quantifier set {A-QUNSET}. If not, then control transfers to "H", which returns to block 532 to complete the loop. Otherwise, control transfers to block 536.

Block 536 is a decision block that determines whether the predicate is in the form of "C=EXPRESSION" or "EXPRESSION=C", where "EXPRESSION" can be a complex expression that does not contain any columns associated with the quantifier QUN. If not, then control transfers to "H", which returns to block 532 to complete the loop. Otherwise, control transfers to block 538.

Block 538 is a decision block that determines whether C is a column associated with the QUN. If not, then control transfers to "H", which returns to block 532 to complete the loop. Otherwise, control transfers to block 540.

Block 540 adds the column C to PKEYSET. Thereafter, control transfers to "H", which returns to block 532 to complete the loop.

Figure 5E:
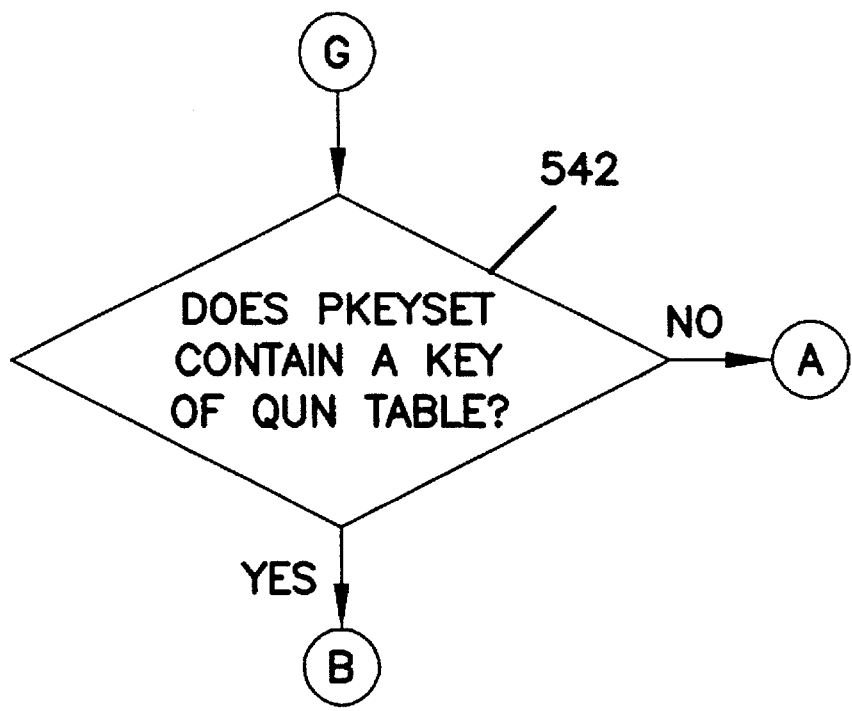

Referring now to FIG. 5E, control transfers from "G" to block 542, which is a decision block that determines whether PKEYSET contains a key of the table that QUN is ranging over. If not, then control transfers to "A" in FIG. 5F. Otherwise, control transfers to "B" in FIG. 5A, which returns to block 506 to complete the loop.

Figure 5F:
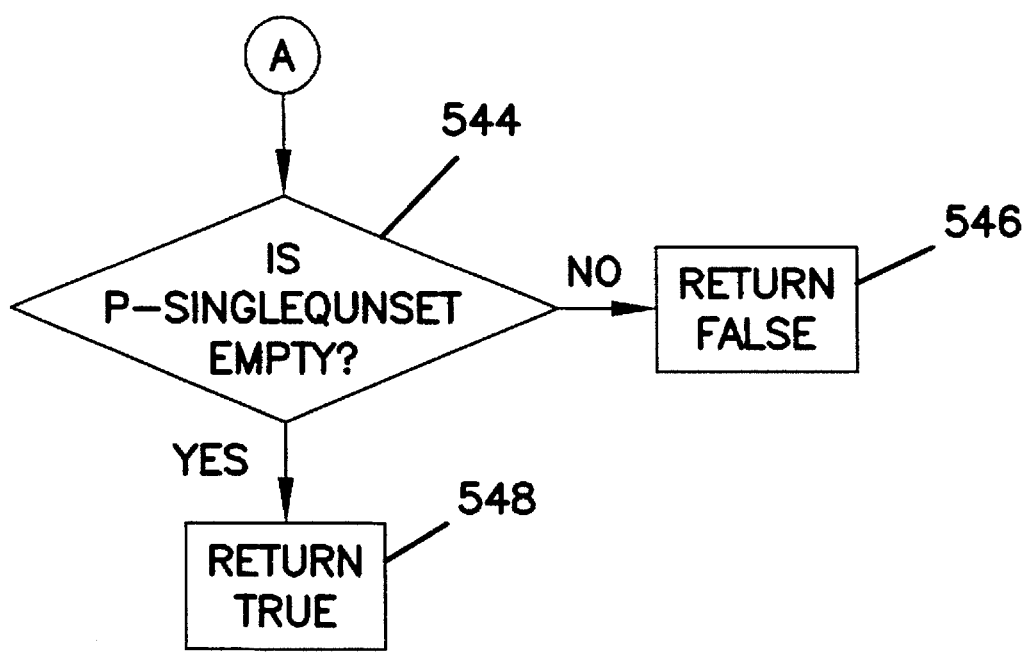

Referring now to FIG. 5F, control transfers from "A" to block 544, which is a decision block that determines whether P-SINGLEQUNSET is empty. If not, then control transfers to block 546. Otherwise, control transfers to block 548. Block 546 returns a "false" value to the calling routine, whereas block 548 returns a "true" value to the calling routine.

SCALAR SUBQUERY TO JOIN TRANSFORMATION

FIG. 6 is a flowchart that illustrates the steps required for determining whether a scalar subquery can be transformed into a join operation, and then performing the transformation. This method is preferably implemented as a routine or series of functions performed in the RDBMS executed by the computer system 102.

Block 602 represents the acceptance of the inputs into the SCALAR SUBQUERY-TO-JOIN routine, which comprises a SELECT-FROM-WHERE query, preferably in QGM format.

Block 604 is a decision block that represents a sequential "for" loop that is executed once for each scalar subquery in the query. Block 604 transfers control to block 606 as the first step of the loop for each scalar subquery in the query. Otherwise, control transfers to block 608 after all the scalar subqueries in the query have been processed in the loop, which returns to the calling routine in FIG. 4.

Block 606 is a decision block that determines whether the column returned from the scalar subquery is an operand of a relational operator selected from the group comprising (=, <>, >, <, <=, >=) which forms a Boolean factor. If not, control transfers to block 604 to complete the loop. Otherwise, control transfers to block 610.

Block 610 collects all bindings in the subquery into a set denoted as BINDCOL, wherein the bindings include constants, host variables, parameter markers, and correlation bindings.

Block 612 invokes the 1-TUPLE-CONDITION routine, passing as parameters the subquery, an empty set for the BCOL set, and the BINDCOL set. Upon completion, the 1-TUPLE-CONDITION returns a "true" or "false" value indicating whether the condition exists or not.

Block 614 is a decision block that determines whether the return value from the 1-TUPLE-CONDITION routine is true. If not, control transfers to block 604 to complete the loop. Otherwise, control transfers to block 616.

Block 616 converts the scalar subquery into a join operation. Control then transfers to block 604 to complete the loop.

DISTINCT PULLUP TRANSFORMATION

FIG. 7 is a flowchart that illustrates the steps required for determining whether a DISTINCT pullup transformation can be performed, and then performing the transformation. This method is preferably implemented as a routine or series of functions performed in the RDBMS executed by the computer system 102.

Definitions

Following are definitions for a number of terms used in the DISTINCT-PULLUP routine. These definitions are required for an understanding of the flowchart that illustrates the method of the DISTINCT-PULLUP routine.

Head Expression

In the SELECT clause of a query, each output column has its own expression, called a head expression. A head expression can be a simple expression that contains only a column reference, or a complex expression that can be arbitrarily complex as long as it is scalar. For example, consider the following query:

SELECT C1, C2+C3, FLOAT (C1) FROM T1

The first output column (C1) and the third output column (FLOAT(C1)) are produced by simple head expressions that contain a column C1 from table T. The second output column (C2+C3) is produced by a complex head expression, i.e., an addition operation of two columns.

COL(EXP)

For a simple head expression, denoted as (HXP), the column reference in the head expression is denoted as COL(HXP). For example, in the third output column in the above SELECT query, the COL(HXP) is C1.

HXP-STRONG

A head expression is considered as HXP-STRONG if (1) it is a simple head expression, and (2) no two different values from COL(HXP) produce the same output column value. For example, if a column C1 is of data type INTEGER, then a head expression "FLOAT(C1)" is HXP-STRONG. On the other hand, if a column C2 is of data type DECIMAL, then "INTEGER(C2)" is not HXP-STRONG (e.g., 1.1 and 1.2 can produce the same output: 1).

HXPCOL

The set HXPCOL is a set of column references in HXP-STRONG head expressions.

Flowchart

Block 702 represents the acceptance of the inputs into the DISTINCT PULLUP routine, which comprises a SELECT-FROM-WHERE query, preferably in QGM format, that has a DISTINCT clause in the SELECT clause. Block 704 represents an initialization step, wherein the set HXPCOL is set to empty.

Block 706 is a decision block that represents a sequential "for" loop that is executed once for each head expression, i.e., HXP, in the query. Block 706 transfers control to block 708 as the first step of the loop for each head expression in the query. Otherwise, control transfers to block 712 after all the head expressions in the query have been processed in the loop.

Block 708 is a decision block that determines whether the HXP is HXP-STRONG. If not, control transfers to block 706 to complete the loop. Otherwise, control transfers to block 710, which adds COL(HXP) to the set HXPCOL.

After the loop at block 706 is completed, block 712 collect all bindings in the query into a set denoted as BINDCOL, including constants, host variables, parameter markers, and correlation bindings if the query is an intermediate query block.

Block 714 invokes the 1-TUPLE-CONDITION routine, passing as parameters the query, the HXPCOL set, and the BINDCOL set. Upon completion, the 1-TUPLE-CONDITION returns a "true" or "false" value indicating whether the 1-tuple condition exists or not.

Block 716 is a decision block that determines whether the return value from the 1-TUPLE-CONDITION routine is true. If not, control transfers to block 718, which returns to the calling routine. Otherwise, control transfers to block 720.

Block 720 removes the DISTINCT keyword from the SELECT clause. Control then transfers to block 718, which returns to the calling routine.

CONCLUSION

This concludes the description of the preferred embodiment of the invention. The following describes some alternative embodiments for accomplishing the present invention. For example, any type of computer, such as a mainframe, minicomputer, or personal computer, could be used with the present invention. In addition, any software program adhering (either partially or entirely) to the SQL language could benefit from the present invention.

In summary, the present invention discloses a method and apparatus for optimizing SQL queries by exploiting uniqueness properties for the queries. These uniqueness properties are identified by determining whether a generalized 1-tuple condition exists for the query.

In identifying whether a generalized 1-tuple condition exists, the query is first analyzed to determine whether any columns referenced in a predicate of the query are bound. According to the present invention, columns may be bound to constant values or correlated columns or columns that are already bound. The bound columns, if any, are then analyzed to determine whether any of the bound columns comprise a key for its associated table. If these conditions exist, then the query satisfies the 1-tuple condition, in that it returns at most one tuple.

Once the generalized 1-tuple condition has been identified to exist for the query, important query transformations can be performed for optimization purposes. These query transformations comprise the transformation of scalar subqueries into joins, or the elimination of distinctiveness requirements (i.e., DISTINCT keywords) from SELECT clauses.

With regard to the transformations of scalar subqueries, the present invention analyzes the query to determine whether a predicate of the query includes a scalar subquery as an operand to a relational operator as a Boolean factor in the WHERE clause. If so, the scalar subquery is analyzed to determined whether it returns at most one tuple using the steps described above. If both conditions are met, then the scalar subquery can be transformed into a join operation in the query.

With regard to the elimination of distinctiveness requirements, the present invention analyzes the query by determining whether the query includes a distinctiveness requirement for a result table, collecting a set of output columns that can be bound to a single value, and determining whether the query returns at most one tuple by assuming the column set obtained a priori are bound. If these conditions are met, then the distinctiveness requirement for the result table can be removed from the query.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of optimizing an SQL query in a computer having a memory, the SQL query being performed by the computer to retrieve data from a relational database stored in a electronic storage device coupled to the computer, the method comprising the steps of:

(a) examining the query in the memory of the computer to determine whether any columns referenced in a predicate of the query are bound;

(b) examining the query in the memory of the computer to determine whether any of the bound columns prohibit duplicate values in its associated table; and (c) identifying the query in the memory of the computer as satisfying a 1-tuple condition when at least one of the bound columns prohibit duplicate values in its associated table, wherein the 1-tuple condition indicates that the query returns at most one tuple.

2. The method as set forth in claim 1 above, wherein the bound column is bound to a constant value.

3. The method as set forth in claim 1 above, wherein the bound column is bound to a correlated column.

4. The method as set forth in claim 1 above, wherein the bound column is bound to a column that is already bound.

5. The method as set forth in claim 1 above, wherein the examining step (b) comprises the step of examining the query in the memory of the computer to determine whether any of the bound columns comprise a key for its associated table.

6. A method of optimizing an SQL query in a computer having a memory, the SQL query being performed by the computer to retrieve data from a relational database stored in an electronic storage device coupled to the computer, the method comprising the steps of:

(a) examining the query in the memory of the computer to determine whether a predicate of the query includes a scalar subquery as an operand to a relational operator as a Boolean factor;

(b) examining the query in the memory of the computer to determine whether the scalar subquery returns at most one tuple; and (c) transforming the query in the memory of the computer to replace the scalar subquery with a join when the scalar subquery is an operand to a relational operator and the scalar subquery returns at most one tuple.

7. The method as set forth in claim 6 above, wherein the examining step (b) further comprises the steps of:

(1) examining the scalar subquery in the memory of the computer to determine whether any columns referenced in a predicate of the scalar subquery are bound;

(2) examining the scalar subquery in the memory of the computer to determine whether any of the bound columns comprise a key for its associated table; and (3) identifying the scalar subquery in the memory of the computer as satisfying a 1-tuple condition when for each table at least one of the bound columns comprise the key for that table, wherein the 1-tuple condition indicates that the scalar subquery returns at most one tuple.

8. A method of optimizing an SQL query in a computer having a memory, the SQL query being performed by the computer to retrieve data from the relational database stored in an electronic storage device coupled to the computer, the method comprising the steps of:

(a) examining the query in the memory of the computer to determine whether the query includes a distinctiveness requirement for a result table;

(b) collecting a set of output columns of the query in the memory of the computer that can be bound to a single value;

(c) determining whether the query in the memory of the computer returns at most one tuple by assuming the collected set of output columns are bound; and (d) removing the distinctiveness requirement from the query when the query includes the distinctiveness requirement for the result table and the query returns at most one tuple.

9. The method as set forth in claim 8 above, wherein the examining step (b) further comprises the steps of:

(1) examining the query in the memory of the computer to determine whether any columns referenced in a predicate of the query are bound;

(2) examining the query in the memory of the computer to determine whether any of the bound columns comprise a key for its associated table; and (3) identifying the query in the memory of the computer as satisfying a 1-tuple condition when for each table at least one of the bound columns comprise the key for that table, wherein the 1-tuple condition indicates that the query returns at most one tuple.

10. An apparatus for optimizing an SQL query, comprising:

(a) a computer having a memory and an electronic storage device coupled thereto, the data storage device storing a relational database;

(b) means, performed by the computer, for accepting the SQL query into the memory of the computer, the SQL query being performed by the computer to retrieve data from a relational database stored in the computer;

(c) means, performed by the computer, for examining the query in the memory of the computer to determine whether any columns referenced in a predicate of the query are bound;

(d) means, performed by the computer, for examining the query in the memory of the computer to determine whether any of the bound columns prohibit duplicate values in its associated table; and (e) means, performed by the computer, for identifying the query in the memory of the computer as satisfying a 1-tuple condition when at least one of the bound columns prohibit duplicate values in its associated table, wherein the 1-tuple condition indicates that the query returns at most one tuple.

11. An apparatus for optimizing an SQL query, comprising:

(a) a computer having a memory and an electronic storage device coupled thereto, the data storage device storing a relational database;

(b) means, performed by the computer, for accepting the SQL query into the memory of the computer, the SQL query being performed by the computer to retrieve data from a relational database stored in the computer;

(c) means, performed by the computer, for examining the query in the memory of the computer to determine whether a predicate of the query includes a scalar subquery as an operand to a relational operator as a Boolean factor;

(d) means, performed by the computer, for examining the query in the memory of the computer to determine whether the scalar subquery returns at most one tuple; and (e) means, performed by the computer, for transforming the query in the memory of the computer to replace the scalar subquery with a join when the scalar subquery is an operand to a relational operator and the scalar subquery returns at most one tuple.

12. An apparatus for optimizing an SQL query, comprising:

(a) a computer having a memory and an electronic storage device coupled thereto, the data storage device storing a relational database;

(b) means, performed by the computer, for accepting the SQL query into the memory of the computer, the SQL query being performed by the computer to retrieve data from a relational database stored in the computer;

(c) means, performed by the computer, for examining the query in the memory of the computer to determine whether the query includes a distinctiveness requirement for a result table;

(d) means, performed by the computer, for collecting a set of output columns of the query that can be bound to a single value;

(e) means, performed by the computer, for determining whether the query returns at most one tuple by assuming the collected set of output columns are bound; and (f) means, performed by the computer, for removing the distinctiveness requirement from the query when the query includes the distinctiveness requirement for the result table and the query returns at most one tuple.

13. A program storage device readable by a computer, tangibly embodying a program of instructions executable by the computer to perform method steps for optimizing an SQL query in a computer having a memory, the SQL query being performed by the computer to retrieve data from a relational database stored in an electronic storage device coupled to the computer, the method comprising the steps of:

(a) examining the query in the memory of the computer to determine whether any columns referenced in a predicate of the query are bound;

(b) examining the query in the memory of the computer to determine whether any of the bound columns prohibit duplicate values in its associated table; and (c) identifying the query in the memory of the computer as satisfying a 1-tuple condition when at least one of the bound columns prohibit duplicate values in its associated table, wherein the 1-tuple condition indicates that the query returns at most one tuple.

14. A program storage device readable by a computer, tangibly embodying a program of instructions executable by the computer to perform method steps for optimizing an SQL query in a computer having a memory, the SQL query being performed by the computer to retrieve data from a relational database stored in an electronic storage device coupled to the computer, the method comprising the steps of:

(a) examining the query in the memory of the computer to determine whether a predicate of the query includes a scalar subquery as an operand to a relational operator as a Boolean factor;

(b) examining the query in the memory of the computer to determine whether the scalar subquery returns at most one tuple; and (c) transforming the query in the memory of the computer to replace the scalar subquery with a join when the scalar subquery is an operand to a relational operator and the scalar subquery returns at most one tuple.

15. A program storage device readable by a computer, tangibly embodying a program of instructions executable by the computer to perform method steps for optimizing an SQL query in a computer having a memory, the SQL query being performed by the computer to retrieve data from a relational database stored in an electronic storage device coupled to the computer, the method comprising the steps of:

(a) examining the query in the memory of the computer to determine whether the query includes a distinctiveness requirement for a result table;

(b) collecting a set of output columns of the query in the memory of the computer that can be bound to a single value;

(c) examining the query in the memory of the computer to determine whether the query returns at most one tuple by assuming the collected set of output columns are bound; and (d) removing the distinctiveness requirement from the query when the query includes the distinctiveness requirement for the result table and the query returns at most one tuple.

* * * * *

UNITED STATES PATENT AND TRADEMARK OFFICE
CERTIFICATE OF CORRECTION

PATENT NO. : 5,615,361

DATED : March 25, 1997

INVENTOR(S) : Ting Y. Leung et al

It is certified that error appears in the above-identified patent and that said Letters Patent is hereby corrected as shown below:

After "[75] Inventors: Calif.; Lori G. Strain," "Etobicoke" should read --Tobicoke--.

Column 7, line 10, "GIGS" should read --CICS--.

Column 8, line 4, "SOL" should read --SQL--.

Column 8, line 7, "SOL" should read --SQL--.

Column 8, line 13, "SOL" should read --SQL--.

Column 8, line 23, "SOL" should read --SQL--.

Column 18, beginning at line 11, insert the following claims 16-27:

16. The apparatus as set forth in claim 10 above, wherein the bound column is bound to a constant value.

17. The apparatus as set forth in claim 10 above, wherein the bound column is bound to a correlated column.

18. The apparatus as set forth in claim 10 above, wherein the bound column is bound to a column that is already bound.

19. The apparatus as set forth in claim 10 above, wherein the means for examining (b) comprises means for examining the query in the memory of the computer to determine whether any of the bound columns comprise a key for its associated table.

UNITED STATES PATENT AND TRADEMARK OFFICE
CERTIFICATE OF CORRECTION

PATENT NO. : 5,615,361

DATED : March 25, 1997

INVENTOR(S) : Ting Y. Leung et al

It is certified that error appears in the above-identified patent and that said Letters Patent is hereby corrected as shown below:

20. The method as set forth in claim 13 above, wherein the bound column is bound to a constant value.

21. The method as set forth in claim 13 above, wherein the bound column is bound to a correlated column.

22. The method as set forth in claim 13 above, wherein the bound column is bound to a column that is already bound.

23. The method is set forth in claim 13 above, wherein the examining step (b) comprises the step of examining the query in the memory of the computer to determine whether any of the bound columns comprise a key for its associated table.

24. The apparatus as set forth in claim 11 above, wherein the means for examining further comprises:

(1) means for examining the scalar subquery in the memory of the computer to determine whether any columns referenced in a predicate of the scalar subquery are bound;

(2) means for examining the scalar subquery in the memory of the computer to determine whether any of the bound columns comprise a key for its associated table; and

UNITED STATES PATENT AND TRADEMARK OFFICE
CERTIFICATE OF CORRECTION

PATENT NO. : 5,615,361

DATED : March 25, 1997

INVENTOR(S) : Ting Y. Leung et al

It is certified that error appears in the above-identified patent and that said Letters Patent is hereby corrected as shown below:

(3) means for identifying the scalar subquery in the memory of the computer as satisfying a 1-tuple condition when for each table at least one of the bound columns comprise the key for that table, wherein the 1-tuple condition indicates that the scalar subquery returns at most one tuple.

25. The method as set forth in claim 14 above, wherein the examining step (b) further comprises the steps of:

(1) examining the scalar subquery in the memory of the computer to determine whether any columns referenced in a predicate of the scalar subquery are bound;

(2) examining the scalar subquery in the memory of the computer to determine whether any of the bound columns comprise a key for its associated table; and (3) identifying the scalar subquery in the memory of the computer as satisfying a 1-tuple condition when for each table at least one of the bound columns comprise the key for that table, wherein the 1-tuple condition indicates that the scalar subquery returns at most one tuple.

26. The apparatus as set forth in claim 12 above, wherein the means for examining (b) further comprises:

UNITED STATES PATENT AND TRADEMARK OFFICE
CERTIFICATE OF CORRECTION

PATENT NO. : 5,615,361

DATED : March 25, 1997

INVENTOR(S) : Ting Y. Leung et al

It is certified that error appears in the above-identified patent and that said Letters Patent is hereby corrected as shown below:

(1) means for examining the query in the memory of the computer to determine whether any columns referenced in a predicate of the query are bound;

(2) means for examining the query in the memory of the computer to determine whether any of the bound columns comprise a key for its associated table; and (3) means for identifying the query in the memory of the computer as satisfying a 1-tuple condition when for each table at least one of the bound columns comprise the key for that table, wherein the 1-tuple condition indicates that the query returns at most one tuple.

27. The method as set forth in claim 15 above, wherein the examining step (b) further comprises the steps of:

(1) examining the query in the memory of the computer to determine whether any columns referenced in a predicate of the query are bound;

(2) examining the query in the memory of the computer to determine whether any of the bound columns comprise a key for its associated table; and

UNITED STATES PATENT AND TRADEMARK OFFICE
CERTIFICATE OF CORRECTION

PATENT NO. :   5,615,361

DATED        :   March 25, 1997

INVENTOR(S) :  Ting Y. Leung et al

It is certified that error appears in the above-identified patent and that said Letters Patent is hereby corrected as shown below:

(3) identifying the query in the memory of the computer as satisfying a 1-tuple condition when for each table at least one of the bound columns comprise the key for that table, wherein the 1-tuple condition indicates that the query returns at most one tuple.

Signed and Sealed this

Twenty-fifth Day of November, 1997

Attest:

BRUCE LEHMAN

Attesting Officer

Commissioner of Patents and Trademarks